United States Patent
Selinfreund et al.

(10) Patent No.: US 7,486,790 B1
(45) Date of Patent: Feb. 3, 2009

(54) METHOD AND APPARATUS FOR CONTROLLING ACCESS TO STORAGE MEDIA

(75) Inventors: Richard H. Selinfreund, Guilford, CT (US); Donald Roland Goyette, Plainfield, CT (US); Jeffrey M. Drew, Branford, CT (US); Rakesh Vig, Durham, CT (US)

(73) Assignee: Verification Technologies, Inc., Essex, CT (US)

( * ) Notice: Subject to any disclaimer, the term of this patent is extended or adjusted under 35 U.S.C. 154(b) by 1077 days.

(21) Appl. No.: 09/631,585

(22) Filed: Aug. 3, 2000

Related U.S. Application Data

(63) Continuation-in-part of application No. 09/608,886, filed on Jun. 30, 2000, now abandoned.

(51) Int. Cl.
*H04N 7/167* (2006.01)
(52) U.S. Cl. .................. 380/201; 380/200; 380/203; 713/193; 369/288; 369/291.1; 726/26; 726/32; 726/33
(58) Field of Classification Search ................. 713/193; 369/288, 291.1; 726/26, 32, 33; 430/270; 380/200, 201, 203
See application file for complete search history.

(56) References Cited

U.S. PATENT DOCUMENTS

| | | | |
|---|---|---|---|
| 1,822,098 A | 9/1931 | Huntress | |
| 2,265,196 A | 12/1941 | Riley | |
| 2,521,124 A | 9/1950 | Miller | |
| 3,356,462 A | 12/1967 | Cooke et al. | |
| 3,412,245 A | 11/1968 | Halverson | |
| 3,444,517 A | 5/1969 | Rabinow | |
| 3,473,027 A | 10/1969 | Freeman et al. | |
| 3,500,047 A | 3/1970 | Berry | |
| 3,533,744 A | 10/1970 | Unger | |
| 3,591,283 A | 7/1971 | Peisach | |
| 3,624,644 A | 11/1971 | Higgins | |
| 3,649,464 A | 3/1972 | Freeman | |
| 3,662,181 A | 5/1972 | Hercher et al. | |
| 3,663,813 A | 5/1972 | Shaw | |
| 3,886,083 A | 5/1975 | Laxer | |

(Continued)

FOREIGN PATENT DOCUMENTS

DE    2 118 928    11/1971

(Continued)

OTHER PUBLICATIONS

Wittmann et al. Saturable absorption dynamics of mode-locking dye DODCI, Springer-Verlag, appl. phys. B 65, 1997, pp. 761-769.*

(Continued)

*Primary Examiner*—Kim Yen Vu
*Assistant Examiner*—Beemnet W Dada
(74) *Attorney, Agent, or Firm*—Kelley Drye & Warren LLP

(57) ABSTRACT

A method and apparatus for controlling access to a storage medium, such as an optically readable medium. Light sensitive or other materials that are adapted to change state and affect reading of a storage medium are used to control access to data that may be stored on optical medium and/or to control use of the medium.

39 Claims, 3 Drawing Sheets

U.S. PATENT DOCUMENTS

| | | |
|---|---|---|
| 3,928,226 A | 12/1975 | McDonough et al. |
| 3,992,158 A | 11/1976 | Przybylowicz et al. |
| 3,996,006 A | 12/1976 | Pagano |
| 4,015,131 A | 3/1977 | McDonough et al. |
| 4,018,643 A | 4/1977 | Levine |
| 4,038,151 A | 7/1977 | Fadler et al. |
| 4,053,433 A | 10/1977 | Lee |
| 4,077,845 A | 3/1978 | Johnson |
| 4,078,656 A | 3/1978 | Crane et al. |
| D248,044 S | 5/1978 | Odom, Jr. et al. |
| 4,087,332 A | 5/1978 | Hansen |
| 4,118,280 A | 10/1978 | Charles et al. |
| 4,146,792 A | 3/1979 | Stenzel et al. |
| 4,154,795 A | 5/1979 | Thorne |
| 4,202,491 A | 5/1980 | Suzuki |
| 4,235,964 A | 11/1980 | Bochner |
| 4,243,694 A | 1/1981 | Mansukhani |
| 4,260,392 A | 4/1981 | Lee |
| 4,329,317 A | 5/1982 | Detweiler et al. |
| 4,365,970 A | 12/1982 | Lawrence et al. |
| 4,382,064 A | 5/1983 | Detweiler et al. |
| 4,387,112 A | 6/1983 | Blach |
| 4,439,356 A | 3/1984 | Khanna et al. |
| 4,450,231 A | 5/1984 | Ozkan |
| 4,451,521 A | 5/1984 | Kaule et al. |
| 4,451,530 A | 5/1984 | Kaule et al. |
| 4,468,410 A | 8/1984 | Zeya |
| 4,485,308 A | 11/1984 | Rabatin |
| 4,486,536 A | 12/1984 | Baker et al. |
| 4,501,496 A | 2/1985 | Griffin |
| 4,514,085 A | 4/1985 | Kaye |
| 4,540,595 A | 9/1985 | Acitelli et al. |
| 4,542,288 A | 9/1985 | Drexler |
| 4,557,900 A | 12/1985 | Heitzmann |
| 4,567,370 A | 1/1986 | Falls |
| 4,577,289 A | 3/1986 | Comerford et al. |
| 4,589,551 A | 5/1986 | Hellon |
| 4,589,743 A | 5/1986 | Clegg |
| 4,598,205 A | 7/1986 | Kaule et al. |
| 4,620,776 A | 11/1986 | Ima |
| 4,631,174 A | 12/1986 | Kondo |
| 4,632,901 A | 12/1986 | Valkirs et al. |
| 4,642,526 A | 2/1987 | Hopkins |
| 4,663,518 A | 5/1987 | Borror et al. |
| 4,677,604 A | 6/1987 | Selby, III et al. |
| 4,734,796 A | 3/1988 | Grynberg et al. |
| 4,736,425 A | 4/1988 | Jalon |
| 4,746,631 A | 5/1988 | Clagett |
| 4,756,557 A | 7/1988 | Kaule et al. |
| 4,767,205 A | 8/1988 | Schwartz et al. |
| 4,789,804 A | 12/1988 | Karube et al. |
| 4,806,316 A | 2/1989 | Johnson et al. |
| 4,818,677 A | 4/1989 | Hay-Kaufman et al. |
| 4,823,210 A | 4/1989 | Bond |
| 4,849,836 A | 7/1989 | Kachikian |
| 4,858,036 A | 8/1989 | Ginkel |
| 4,865,812 A | 9/1989 | Kuntz et al. |
| 4,866,769 A | 9/1989 | Karp |
| 4,879,704 A | 11/1989 | Takagi et al. |
| 4,882,195 A | 11/1989 | Butland |
| 4,889,365 A | 12/1989 | Chouinard |
| 4,897,173 A | 1/1990 | Nankai et al. |
| 4,921,280 A | 5/1990 | Jalon |
| 4,927,180 A | 5/1990 | Trundle et al. |
| 4,948,442 A | 8/1990 | Manns |
| 4,966,856 A | 10/1990 | Ito et al. |
| 4,975,898 A | 12/1990 | Yoshida |
| 4,983,817 A | 1/1991 | Dolash et al. |
| 5,005,873 A | 4/1991 | West |
| 5,018,866 A | 5/1991 | Osten |
| 5,027,396 A | 6/1991 | Platteter et al. |
| 5,030,421 A | 7/1991 | Muller |
| 5,030,832 A | 7/1991 | Williams et al. |
| 5,039,490 A | 8/1991 | Marsoner et al. |
| 5,047,215 A | 9/1991 | Manns |
| 5,049,673 A | 9/1991 | Tsien et al. |
| 5,093,147 A | 3/1992 | Andrus et al. |
| 5,106,582 A | 4/1992 | Baker |
| 5,118,349 A | 6/1992 | Jalon |
| 5,128,243 A | 7/1992 | Potter et al. |
| 5,128,882 A | 7/1992 | Cooper et al. |
| 5,135,569 A | 8/1992 | Mathias |
| 5,139,812 A | 8/1992 | Lebacq |
| 5,147,042 A | 9/1992 | Levy |
| 5,176,257 A | 1/1993 | Levy |
| 5,182,669 A | 1/1993 | Chikuma et al. |
| 5,194,289 A | 3/1993 | Butland |
| 5,200,051 A | 4/1993 | Cozzette et al. |
| 5,204,852 A * | 4/1993 | Nakagawa et al. ........ 369/275.1 |
| 5,208,630 A | 5/1993 | Goodbrand et al. |
| 5,243,411 A | 9/1993 | Shirochi et al. |
| 5,246,869 A | 9/1993 | Potter et al. |
| 5,260,032 A | 11/1993 | Muller |
| 5,264,103 A | 11/1993 | Yoshioka et al. |
| 5,265,082 A | 11/1993 | Gniwek et al. |
| 5,267,311 A | 11/1993 | Bakhoum |
| 5,272,090 A | 12/1993 | Gavish et al. |
| 5,279,967 A | 1/1994 | Bode |
| 5,282,894 A | 2/1994 | Albert et al. |
| 5,286,286 A | 2/1994 | Winnik et al. |
| 5,292,000 A | 3/1994 | Levy |
| 5,292,855 A | 3/1994 | Krutak et al. |
| 5,311,494 A | 5/1994 | Sugita et al. |
| 5,313,264 A | 5/1994 | Ivarsson et al. |
| 5,319,436 A | 6/1994 | Manns et al. |
| 5,321,261 A | 6/1994 | Valenta |
| 5,336,714 A | 8/1994 | Krutak et al. |
| 5,338,066 A | 8/1994 | Gundjian |
| 5,338,067 A | 8/1994 | Gundjian |
| 5,360,628 A | 11/1994 | Butland |
| 5,366,902 A | 11/1994 | Cox et al. |
| 5,379,433 A | 1/1995 | Yamagishi |
| 5,381,476 A | 1/1995 | Kimoto et al. |
| 5,399,451 A | 3/1995 | Hashida et al. |
| 5,400,319 A | 3/1995 | Fite et al. |
| 5,409,583 A | 4/1995 | Yoshioka et al. |
| 5,409,666 A | 4/1995 | Nagel et al. |
| 5,418,852 A | 5/1995 | Itami et al. |
| 5,418,855 A | 5/1995 | Liang et al. |
| 5,421,869 A | 6/1995 | Gundjian et al. |
| 5,424,959 A | 6/1995 | Reyes et al. |
| 5,426,625 A | 6/1995 | Bui et al. |
| 5,429,952 A | 7/1995 | Garner et al. |
| 5,430,281 A | 7/1995 | Lentz et al. |
| 5,438,403 A | 8/1995 | Hoshino et al. |
| 5,450,190 A | 9/1995 | Schwartz et al. |
| 5,453,968 A | 9/1995 | Veldhuis et al. |
| 5,457,527 A | 10/1995 | Manns et al. |
| 5,461,239 A | 10/1995 | Atherton |
| 5,468,650 A | 11/1995 | Skov et al. |
| 5,473,584 A | 12/1995 | Oshima |
| 5,475,468 A | 12/1995 | Natsudaira |
| 5,494,638 A | 2/1996 | Gullick |
| 5,496,701 A | 3/1996 | Pollard-Knight |
| 5,498,549 A | 3/1996 | Nagel et al. |
| 5,510,163 A | 4/1996 | Sullivan |
| 5,513,169 A | 4/1996 | Fite et al. |
| 5,513,260 A | 4/1996 | Ryan |
| 5,516,362 A | 5/1996 | Gundjian et al. |
| 5,521,984 A | 5/1996 | Denenberg et al. |
| 5,525,516 A | 6/1996 | Krutak et al. |
| 5,532,104 A | 7/1996 | Goto |
| 5,538,773 A | 7/1996 | Kondo |
| 5,545,567 A | 8/1996 | Gretillat et al. |

| | | | | | | |
|---|---|---|---|---|---|---|
| 5,546,471 | A | 8/1996 | Merjanian | 5,837,042 A | 11/1998 | Lent et al. |
| 5,547,501 | A | 8/1996 | Maruyama et al. | 5,841,861 A | 11/1998 | Kondo et al. |
| 5,563,947 | A | 10/1996 | Kikinis | 5,847,141 A | 12/1998 | Malkin |
| 5,568,177 | A | 10/1996 | Talvalkar et al. | 5,851,489 A | 12/1998 | Wolf et al. |
| 5,569,317 | A | 10/1996 | Sarada et al. | 5,856,174 A | 1/1999 | Lipshutz et al. |
| 5,569,613 | A | 10/1996 | Yang | 5,861,618 A | 1/1999 | Berson |
| 5,570,379 | A | 10/1996 | Sasaki et al. | 5,867,586 A | 2/1999 | Liang et al. |
| 5,572,589 | A | 11/1996 | Waters et al. | 5,874,219 A | 2/1999 | Rava et al. |
| 5,574,787 | A | 11/1996 | Ryan | 5,881,038 A | 3/1999 | Oshima et al. |
| 5,574,790 | A | 11/1996 | Liang et al. | 5,905,800 A | 5/1999 | Moskowitz et al. |
| 5,582,697 | A | 12/1996 | Ikeda et al. | 5,907,144 A | 5/1999 | Poon et al. |
| 5,587,984 | A | 12/1996 | Owa et al. | 5,915,027 A | 6/1999 | Cox et al. |
| 5,589,350 | A | 12/1996 | Bochner | 5,919,712 A | 7/1999 | Herron et al. |
| 5,592,454 | A | 1/1997 | Tobita et al. | 5,922,188 A | 7/1999 | Ikeda et al. |
| 5,596,639 | A | 1/1997 | Kikinis | 5,922,550 A | 7/1999 | Everhart et al. |
| 5,598,399 | A | 1/1997 | Ogihara et al. | 5,922,591 A | 7/1999 | Anderson et al. |
| 5,599,578 | A | 2/1997 | Butland | 5,922,594 A | 7/1999 | Löfås |
| 5,608,225 | A | 3/1997 | Kamimura et al. | 5,923,413 A | 7/1999 | Laskowski |
| 5,608,717 | A | 3/1997 | Ito et al. | 5,923,754 A | 7/1999 | Angelo et al. |
| 5,611,433 | A | 3/1997 | Levy | 5,927,547 A | 7/1999 | Papen et al. |
| 5,613,001 | A | 3/1997 | Bakhoum | 5,930,215 A | 7/1999 | Fite et al. |
| 5,614,008 | A | 3/1997 | Escano et al. | 5,933,498 A | 8/1999 | Schneck et al. |
| 5,615,061 | A | 3/1997 | Singh | 5,936,878 A | 8/1999 | Arsenov et al. |
| 5,618,682 | A | 4/1997 | Scheirer | 5,937,164 A | 8/1999 | Mages et al. |
| 5,625,706 | A | 4/1997 | Lee et al. | 5,939,024 A | 8/1999 | Robertson |
| 5,629,914 | A | 5/1997 | Clark et al. | 5,945,252 A | 8/1999 | Sokoluk et al. |
| 5,631,170 | A | 5/1997 | Attridge | D414,272 S | 9/1999 | O'Bear et al. |
| 5,632,959 | A | 5/1997 | Mohajer | 5,949,601 A | 9/1999 | Braithwaite et al. |
| 5,633,836 | A | 5/1997 | Langer et al. | 5,953,417 A | 9/1999 | Quan |
| 5,636,292 | A | 6/1997 | Rhoads | 5,955,352 A | 9/1999 | Inoue et al. |
| 5,641,640 | A | 6/1997 | Hanning | 5,955,729 A | 9/1999 | Nelson et al. |
| 5,644,444 | A | 7/1997 | Braithwaite et al. | 5,958,541 A | 9/1999 | Miller et al. |
| 5,644,566 | A | 7/1997 | Nakayama et al. | 5,961,926 A | 10/1999 | Kolb et al. |
| 5,650,062 | A | 7/1997 | Ikeda et al. | 5,963,536 A * | 10/1999 | Vasic et al. ............ 369/275.3 |
| 5,651,869 | A | 7/1997 | Yoshioka et al. | 5,966,205 A | 10/1999 | Jung et al. |
| 5,652,838 | A | 7/1997 | Lovett et al. | 5,989,835 A | 11/1999 | Dunlay et al. |
| 5,661,703 | A | 8/1997 | Moribe et al. | 5,998,128 A | 12/1999 | Roelant |
| 5,665,151 | A | 9/1997 | Escano et al. | 6,001,573 A | 12/1999 | Roelant |
| 5,671,202 | A | 9/1997 | Brownstein et al. | 6,002,830 A | 12/1999 | Quan |
| 5,671,288 | A | 9/1997 | Wilhelm et al. | 6,009,065 A | 12/1999 | Glushko et al. |
| 5,673,338 | A | 9/1997 | Denenberg et al. | 6,009,071 A | 12/1999 | Ahn et al. |
| 5,677,952 | A | 10/1997 | Blakley, III et al. | 6,011,772 A | 1/2000 | Rollhaus et al. |
| 5,680,383 | A | 10/1997 | Clark et al. | 6,018,374 A | 1/2000 | Wrobleski |
| 5,681,633 | A | 10/1997 | Onagi et al. | 6,027,855 A | 2/2000 | Sokoluk et al. |
| 5,706,047 | A | 1/1998 | Lentz et al. | 6,031,815 A | 2/2000 | Heemskerk |
| 5,706,266 | A | 1/1998 | Brownstein et al. | 6,039,898 A | 3/2000 | Glushko |
| 5,710,626 | A | 1/1998 | O'Rourke et al. | 6,045,888 A * | 4/2000 | Chen et al. ................. 428/64.1 |
| 5,711,915 | A | 1/1998 | Siegmund et al. | 6,052,354 A | 4/2000 | Gudesen et al. |
| 5,716,825 | A | 2/1998 | Hancock et al. | 6,052,465 A | 4/2000 | Gotoh et al. |
| 5,719,948 | A | 2/1998 | Liang | 6,071,671 A | 6/2000 | Glushko et al. |
| 5,728,350 | A | 3/1998 | Kinoshita et al. | 6,083,597 A * | 7/2000 | Kondo ....................... 428/64.1 |
| 5,736,342 | A | 4/1998 | Van Wie et al. | 6,091,563 A * | 7/2000 | Thomas et al. ................ 360/69 |
| 5,740,574 | A | 4/1998 | Piraino | 6,094,413 A | 7/2000 | Guerra |
| 5,753,511 | A | 5/1998 | Selinfreund | 6,099,930 A * | 8/2000 | Cyr et al. .................... 428/64.1 |
| 5,760,384 | A | 6/1998 | Itoh et al. | 6,104,561 A | 8/2000 | Braithwaite et al. |
| 5,761,301 | A | 6/1998 | Oshima et al. | 6,104,686 A | 8/2000 | Whitcher et al. |
| 5,762,873 | A | 6/1998 | Fanning et al. | 6,115,344 A | 9/2000 | Gudesen et al. |
| 5,770,348 | A | 6/1998 | Kondo | 6,122,245 A | 9/2000 | Kondo et al. |
| 5,773,808 | A | 6/1998 | Laser | 6,122,373 A | 9/2000 | Gotoh et al. |
| 5,774,160 | A | 6/1998 | Gundjian | 6,125,181 A | 9/2000 | Gotoh et al. |
| 5,776,713 | A | 7/1998 | Garner et al. | 6,128,388 A | 10/2000 | Gotoh et al. |
| 5,784,193 | A | 7/1998 | Ferguson | 6,141,419 A | 10/2000 | Gotoh et al. |
| 5,786,182 | A | 7/1998 | Catanzariti et al. | 6,144,742 A | 11/2000 | Gotoh et al. |
| 5,786,509 | A | 7/1998 | Belding et al. | 6,157,551 A | 12/2000 | Barak et al. |
| 5,790,489 | A | 8/1998 | O'Connor | 6,160,888 A | 12/2000 | Gotoh et al. |
| 5,800,785 | A | 9/1998 | Bochner | 6,173,109 B1 | 1/2001 | Quan |
| 5,805,549 | A | 9/1998 | Fite et al. | 6,175,629 B1 | 1/2001 | Gotoh et al. |
| 5,805,551 | A | 9/1998 | Oshoma et al. | 6,181,662 B1 * | 1/2001 | Krieger et al. ................. 369/70 |
| 5,807,625 | A | 9/1998 | Amon et al. | 6,188,659 B1 | 2/2001 | Mueller et al. |
| 5,811,152 | A | 9/1998 | Cleary | 6,192,475 B1 | 2/2001 | Wallace |
| 5,815,484 | A * | 9/1998 | Smith et al. ............ 369/275.1 | 6,266,211 B1 * | 7/2001 | Thomas et al. ................ 360/133 |
| 5,818,582 | A | 10/1998 | Fernandez et al. | 6,311,305 B1 * | 10/2001 | Sollish et al. ................. 714/784 |
| 5,822,473 | A | 10/1998 | Magel et al. | 6,365,904 B1 * | 4/2002 | Graves .................... 250/458.1 |

| | | | | |
|---|---|---|---|---|
| 6,424,492 | B1 * | 7/2002 | Allgood et al. | 360/133 |
| 6,571,339 | B1 * | 5/2003 | Danneels et al. | 726/9 |
| 6,838,144 | B2 * | 1/2005 | Bakos et al. | 428/64.1 |

FOREIGN PATENT DOCUMENTS

| | | |
|---|---|---|
| DE | 196 17 106 A1 | 10/1997 |
| EP | 0 327 163 A2 | 8/1989 |
| EP | 0 589 991 B1 | 4/1994 |
| EP | 0 591 315 B1 | 4/1994 |
| EP | 0 736 767 A1 | 10/1996 |
| GB | 1 334 866 | 10/1973 |
| GB | 2 258 528 A | 2/1993 |
| GB | 2 298 713 B | 9/1996 |
| GB | 2 334 574 A | 8/1999 |
| JP | 63184039 | 7/1988 |
| JP | 1-211285 | 8/1989 |
| JP | 4-128834 | 4/1992 |
| JP | 6-204371 | 2/1994 |
| JP | 9-292071 | 11/1997 |
| JP | 11-126425 | 5/1999 |
| WO | WO 95/06249 | 3/1995 |
| WO | WO 97/31332 | 8/1997 |
| WO | WO 98/08180 | 2/1998 |
| WO | WO 98/29238 | 7/1998 |
| WO | WO 99/14055 | 3/1999 |
| WO | WO 99/23649 | 5/1999 |
| WO | WO 99/55055 | 10/1999 |
| WO | WO 00/19430 | 4/2000 |

OTHER PUBLICATIONS

1st Advanced Packaging Technology Conference held Nov. 9-11, 1998, downloaded from http://auburn.main.com/tse/imi/completed/advanced-pkg-euro.html; downloaded Jul. 1999.

AOAC Official Methods Analysis, 1900, pp. 752-754.

Amato, "Fomenting a Revolution, in Miniature," Science, vol. 282, pp. 402-404, Oct. 16, 1998.

Anslyn et al. "Rapid and Efficient Analysis of Multiple Chemical/Biochemical Agents in Solution Using Sensor Arrays: Towards the Development of an Electronic Tongue," The University of Texas at Austin, undated.

Barrett, "Molecular Fingerprinting of Blood Pathogens,"CDD IFT Symposium, Jun. 21-22, 1996.

Biacore Website, "Sensor chips for BIACORE analysis systems", downloaded from webmaster.bia@eu.biacore.com; undated.

Biacore Website, "Principles of BIAtechnology", downloading from webmaster.bia@eu.biacore.com, undated.

Biacore Website, "protein binding", downloaded from webmaster.bia@eu.biacore.com, undated.

Biodiscovery website, "Inventing Expression Bioinformatics", undated.

Biocode product literature, "Covert Product Identification".

Bock G., et al., "Photometric Analysis fo Antifading Reagents for Immunofluorescence with Laser and Conventional Illumination Sources," Journal of Histochemistry and Cytochemistry, 33: 699-705 (1985).

Cambridge Healthtech Institute Website, downloaded from www.healthtech.com, undated.

Chan et al., Biochem, Biophys, Acta, vol. 204, p. 252, 1970.

Constant et al., ACS Abstract, Issue of Chemical and Engineering News, Aug. 25, 1994.

Coons et al., J. Exp. Med., vol. 91, pp. 1-14, 1950.

Corning Microarray Technology Website, "CMT-GAPS Coated Slides—FAQ's", downloaded fromwww.cmt.corning.com/dev/company_info/who/techno... , Oct. 26, 1999.

Crossley et al., Journal of the Chemical Society, Perkin Transactions 2, 1615 (1994).

Dragoco Report, pp. 12-13, 1990.

Fluorescent Inks, downloaded from http://www.uvp.com/html/inks.html; downloaded Jul. 1999.

Freemantle, "Downsizing Chemistry: Chemical analysis and synthesis on micriships promise a variety of potential benefits", C&EN London, pp. 27-36, Feb. 22, 1999.

Furneaux et al., "The formation of controlled-porosity membranes from anodically oxidized aluminum", Nature, vol. 337, No. 6203, pp. 147-149, Jan. 12, 1989.

Furomoto et al., IEEE, J. Quantum Electron, QE-6, 262 (1970).

Genometrix Website, undated.

Gill, D., "Inhibition of fading in fluorescence microscopy of fixed cells," Dept. of Physics, Ben Gurion University, Israel (Jul. 1978).

Glabe et al., "Preperation and Properties of Fluorescent Polysaccharides," Analytical Biochemistry, vol. 130, pp. 287-294, 1983.

Huff, J., "Enhancement of Specific Immunofluorescent Findings with Use of a Para-Phenylenediamine Mounting Buffer," Journal of Investigative Dermatology, 78: 449-450 (1982).

Iatridou, H., et al., Cell Calcium, vol. 15, pp. 190-198, 1994.

The Invisible Barcode, downloaded from http://www.canadianpackaging.com/C... aging, downloaded Jul. 1999.

Johnson, G.D., et al., "Fading of Immunfluorescence during Microscopy: a Study of the Phenomenon and its Remedy," Journal of Immunological Methods, 55: 231-242 (1982).

Johnson, G.D., et al., "A Simple Method of Reducing the Fading of Immunofluorescence During Microscopy," Journal of Immunological Methods, 43: 349-350 (1981).

Junior LB 9509, the portable luminometer; downloaded from http://www.berthold.com.au/bioanalytical/pages/LB9509.html, downloaded Oct. 26, 1999.

Larsen, R., et al., "Spectroscopic and Molecular Modeling Studies of Caffeine Complexes with DNA Intercalators," Biophysical Journal, 70:443-452 (Jan. 1996).

Lee, S.P., et al., "A Fluoremetric Assay for DNA Cleavage Reactions Characterized with BamH1 Restriction Endonuclease," Analytical Biochemistry, 220: 377-383 (1994).

Minta et al., "Fluorescent Indicators for Cytosolic Calcium Based on Rhodamine and Fluorescein Chromophores," Journal of Biological Chemistry, vol. 264, No. 14, pp. 8171-8178, May 15, 1989.

Packard Website, "The Biochip Arrayer", downloaded from www.packardinst.com/prod_serv/-Biochiparrayer.htm, Oct. 26, 1999.

Packard Instrument Company website disclosure: Tools for Life Science Research, pp. 1-2.

Phosphor Technology, downloaded from http:/www.phosphor.demon.co.uk/iruv.htm; downloaded Jul. 1999.

Platt, J. L., et al., "Retardation of Fading Enhancement of Intensity of Immunofluorescence by $p$-Phenylenediamine," Journal of Histochemistry and Cytochemistry, 31:840-842 (1983).

Practical Fluorescence, Second Edition, G.G. Guilbault, Editor, Marcel Dekker, Inc., p. 32, 1990.

Raybourne, "Flow Cytometry in Food Microbiology," IFT Symposium FDA Jun. 21-22, 1996.

Schauer et al., "Cross-reactive optical sensor arrays", ACS Meetings, San Francisco National Meeting, Downloaded from http://schedule.acs.org/cgi-bin/ACS/perso... , Mar. 7, 2000.

Service, "Coming Soon: The Pocket DNA Sequencer," Science, vol. 282, Oct. 16, 1998.

Service, "Microchip Arrays Put DNA on the Spot," vol. 282, Oct. 16, 1998.

Skolnick, "Russian and US Researchers Develop 'Biochips' for Faster, Inexpensive Biomedical Tests", JAMA, vol. 275, No. 8, pp. 581-582, Feb. 28, 1996.

Stanley, "UT scientists engineer a tiny arbiter of taste", Austin American Statesman Newspaper, p. B1, Jul. 26, 1998.

Stringer, "Photonics Center launches three new companies", Mass. High Tech., p. 11, Apr. 26-May 2, 1999.

Stryer, L., "Fluorescence Energy Transfer as a Spectroscopic Ruler," Ann. Rev. Biochem., 47:819-46 (1978).

Uchiyama, H., et al., "Detection of Undergraded Oligonucleotide *in Vivo* Fluorescence Resonance Energy Transfer," Journal of Biological Chemistry, 271: 380-384, Jan. 1996).

V.L. Engineering, Our Products, downloaded from http://www.vlengineering.com/products/wizard_PV6A, Downloaded Jul. 1999.

Wittwer, C.T., et al., "Continuous Fluorescence Monitoring of Rapid Cycle DNA Amplification," BioTechniques, 22:130-138 (Jan. 1997).

Tarkka, Richard M., et al., "Holographic storage in a near-ir sensitive photochromic dye," Optics Communications, vol. 109, pp. 54-58, Jun. 15, 1994.

Amendment under Article 34 of the Patent Cooperation Treaty mailed Jan. 28, 2002.
International Search Report for PCT/US01/10256 mailed Aug. 2, 2002.
International Preliminary Examination Report for PCT/US01/10256 mailed Feb. 13, 2003.

* cited by examiner

METHOD AND APPARATUS FOR CONTROLLING ACCESS TO STORAGE MEDIA

CROSS-REFERENCE TO RELATED APPLICATIONS

This application is a continuation-in-part application and claims the benefit of U.S. patent application Ser. No. 09/608,886, filed on Jun. 30, 2000 now abandoned.

FIELD OF THE INVENTION

The present invention relates to controlling access to storage media, such as data recorded on optical media.

BACKGROUND OF THE INVENTION

Optically readable storage media, such as music and software CD's and video DVD's, provide inexpensive ways to share and disseminate digital information, making such media the media of choice among both producers and consumers. This is clearly evident as CDs have nearly replaced cassette tapes and floppy disks in the music and software industries and DVDs have made significant inroads in replacing video cassette tapes in the home video industry. Because of the high demand for such optical media and because of the ease and low cost of reproduction, counterfeiting has become prevalent.

A variety of copy protection techniques and devices have been developed to limit the unauthorized copying of optical media. Among these techniques are analog Colorstripe Protection System (CPS), CGMS, Content Scrambling System (CSS) and Digital Copy Protection System (DCPS). Analog CPS (also known as Macrovision) provides a method for protecting videotapes as well as DVDs. The implementation of Analog CPS, however, may require the installation of circuitry in every player used to read the media. Typically, when a disk or tape is "Macrovision Protected," the electronic circuit sends a colorburst signal to the composite video and s-video outputs of the player resulting in imperfect copies. The use of Macrovision may also adversely affect normal playback quality.

With CGMS, the media may contain information dictating whether or not the contents of the media can be copied. The device that is being used to copy the media must be equipped to recognize the CGMS signal and also must respect the signal in order to prevent copying. The Content Scrambling System (CSS) may provide an encryption technique that is designed to prevent direct, bit-to-bit copying. Each disk player that incorporates CSS is provided with one of four hundred keys that allow the player to read the data on the media, but prevents the copying of the keys needed to decrypt the data. However, the CSS algorithm has been broken and has been disseminated over the Internet, allowing unscrupulous copyists to produce copies of encrypted disks.

The Digital Copy Protection System (DCPS) provides a method whereby devices that are capable of copying digital media may only copy disks that are marked as copyable. Thus, the disk itself may be designated as uncopyable. However, for the system to be useful, the copying device must include the software that respects the "no copy" designation.

Each of these copy protection techniques, and others that may be available, may make it more difficult to copy material from optical media, and may deter the casual copyist. However, these techniques may be easily circumvented by the unscrupulous copyist who is intent on making digital copies of a disk.

In addition to directly copying content from optical media, producers and distributors of digital content are also adversely affected by unauthorized distribution of content over communications systems, such as the Internet. Known copy protection systems may not be capable of protecting a digital data file from being duplicated if it is intercepted by a copyist during transmission over these communication systems.

SUMMARY OF THE INVENTION

Embodiments of the invention enable control of access to storage media, such as optical disks. A material may be provided on the media that is alterable between at least two states, wherein at least one of the states affects whether or how data is read from the media. The material may represent information, such as a conventional barcode represents information on a package, or an encryption/decryption key, or the presence of the material alone may allow access to the media. The material may prevent reading data from a medium, or alter a result of reading data from a medium, e.g., while the material is in one state a data bit "1" may be read, but while the material is in another state a data bit of "0" may be read. The material may be permanent to allow authorized access to the medium for its normal expected lifetime, or temporary such that the material prevents access to the medium when it is no longer detectable after a certain amount of time or a number of reads of the medium.

Aspects of the invention may also provide for secure downloads of data as well as provide for "uncopyable copies" of data that has been legitimately downloaded from a source. Aspects of the invention may be used to limit the number of times software may be installed or the location of the installation of software. The material may be used to provide dynamic watermarking of data, or used to uniquely identify a specific storage medium.

In another aspect of the invention, an optical media may include a light sensitive material that is positioned in or on the medium so that it provides a code that may be required to install software from the medium onto a computer. For example, the code provided by the pattern of light sensitive material on the medium may be required to match a code that is input by the user of the medium in order for the software contained on the medium to be properly installed.

In another aspect of the invention, a particular medium, for example a CD or a DVD, may be provided with an invisible authentication mark or code in the form of a pattern of light sensitive material. The pattern of light sensitive material that has been placed in or on the medium may be verified by an optical reader prior to allowing the medium to be used for either reading or recording digital data. The medium may include, for example, a phosphorescent dye placed in or on the surface of the medium, and the material may not respond instantaneously to excitation by light of a particular wavelength. However, the material may provide a delayed, persistent response that can be detected upon a later reading.

In another aspect of the invention, an optical medium, for example a CD or a DVD, is provided with a data track that is recorded onto the medium using a temporary light sensitive material. The temporary light sensitive material may allow for a limited number of uses of the data contained in the medium prior to its fading and providing inadequate data to allow the medium to function as originally intended.

In another aspect of the present invention, software may be distributed on a medium that includes a light sensitive material that provides a code allowing the user of the medium to access a portion of the data contained on the medium. For example, the medium may include a version of software that can be freely used and copied to other recording devices. However, to access an advanced program recorded on the medium, a code represented by the pattern of light sensitive material contained in or on the medium must first be detected on the medium itself.

In another aspect of the invention, an optical medium containing a pattern of light sensitive material may be placed in a reader attached to a computer where the pattern of light sensitive material may be detected. A data file, for example a movie or audio file, may then be downloaded from a network to the computer in a form that is unplayable in the absence of the code provided by the light sensitive material on the medium. This may allow for the download of digital files such as movies, over the Internet, that result in playable copies only when recorded onto media that contain the proper sequence of light sensitive material in or on the medium. The system may, for example, prevent the downloading of a digital data file without a properly encoded disk, or in another embodiment, may result in an unplayable copy if not downloaded onto an appropriate disk.

In one embodiment, optical media may include a light sensitive material in addition to any recording layer, such as a data track. The recording layer may be used to record data that may be read from the media to perform a function for which the media is distributed. For example, the media may include a software program recorded on a data track to be used with a personal computer. The light sensitive material may be placed in one or more loci on the media and may or may not represent data that is read from the media when the software is installed.

In another embodiment, the light sensitive material may be used to complete an incomplete data set. For example, a data file may be recorded on a medium so that it includes less than what is necessary to make the data file operable. Enough data may be missing so that error correction techniques may be ineffective. However, the missing data may be provided in the form of, for example, a light sensitive material strategically placed on the medium or on a companion medium. Both data sets may then be combined to result in an operable disk. The entire process may be transparent to the user. Instructions for reading the missing data may be provided, for example, in software contained on the medium, in firmware, in hardware or in instructions provided by the user. Thus, any copy of the medium may be inoperable absent either the strategically placed light sensitive material or the instructions on how to access the light sensitive material.

In another embodiment, access, copying and unauthorized installation of digital data may be prevented by placing light sensitive material in the light path of the reader so that the light sensitive compound interferes with the reading of the underlying data. For example, instructions provided to authorized users of a software program may instruct an installation program to read a specific track and then to wait a specified time to access an adjacent track. Absent these instructions, a light sensitive material will have been activated upon reading the first track and will interfere with the reading of adjacent, or nearby, tracks, for a period of time equal to the time of persistence of the light sensitive material. Thus, authentic reading or installation instructions will provide a map for avoiding these traps. Areas of light sensitive material may be large enough to defeat sophisticated error correction programs, such as EFM and parity bit correction techniques known to those of skill in the art.

The light sensitive material may be placed at a position or a number of positions on the optical medium in order to provide, for example, identification, verification, an access code or additional data. In one embodiment, the light emissive compound may be deposited in or on the optical medium in order to identify the medium or supply information about it, much like a bar code may be used to identify a product or package. For example, the medium may be theoretically divided into a number of sectors, for instance, 20 pie shaped pieces of equal size around a circular optical recording medium such as a CD-ROM or DVD. Depending on where light sensitive material is placed in each of these sectors, digital data may be represented by either the absence or presence of light sensitive material at different locations in each sector. Sampling instructions may be supplied through a number of channels. For example, instructions may be supplied on the medium itself, by the optical reader or by the user of the device. The sampling instructions may direct the reader to sample various locations within each sector looking for the presence or absence of light sensitive material. In addition, the reader may be instructed to sample at a specific time delay or to look for a shift in wavelength from that provided by the light source. Thus, each sector may provide information that may not be detected unless specifics such as position, wavelength, time of delay and persistence of the light sensitive material are known. A number of different materials having different characteristics may be used on a single medium to provide a more sophisticated coding technique.

Light sensitive material may be placed on a medium in a pattern that provides a code to unlock access to data stored on the medium, or elsewhere, such as from an attached data storage device. Thus, the coded optical medium may be used as an uncopyable key to provide access to data, files and information. The light sensitive material may be placed on the medium so that, upon reading, a unique data string is produced that allows the data files to be opened. The data string may be a function of, for example, emission, absorption, wavelength shift, time delay, persistence or intensity of the light sensitive material. Thus, a wide variety of variables may be used with a single medium to provide a sophisticated code. For example, an unscrupulous copyist may try to decode a medium by determining where on the medium delayed emission compounds have been placed. However, other variables such as absorbing compounds, compounds exhibiting different persistence, and compounds emitting at different intensities may be used to further thwart the copyist. Alternatively, the code may be simple, such as the placement of a single spot of light sensitive material on the medium.

These and other aspects of the invention will be apparent from the following description.

BRIEF DESCRIPTION OF THE DRAWINGS

The invention is described, by way of example, with reference to the accompanying drawings, in which.

DETAILED DESCRIPTION

Figure 1:
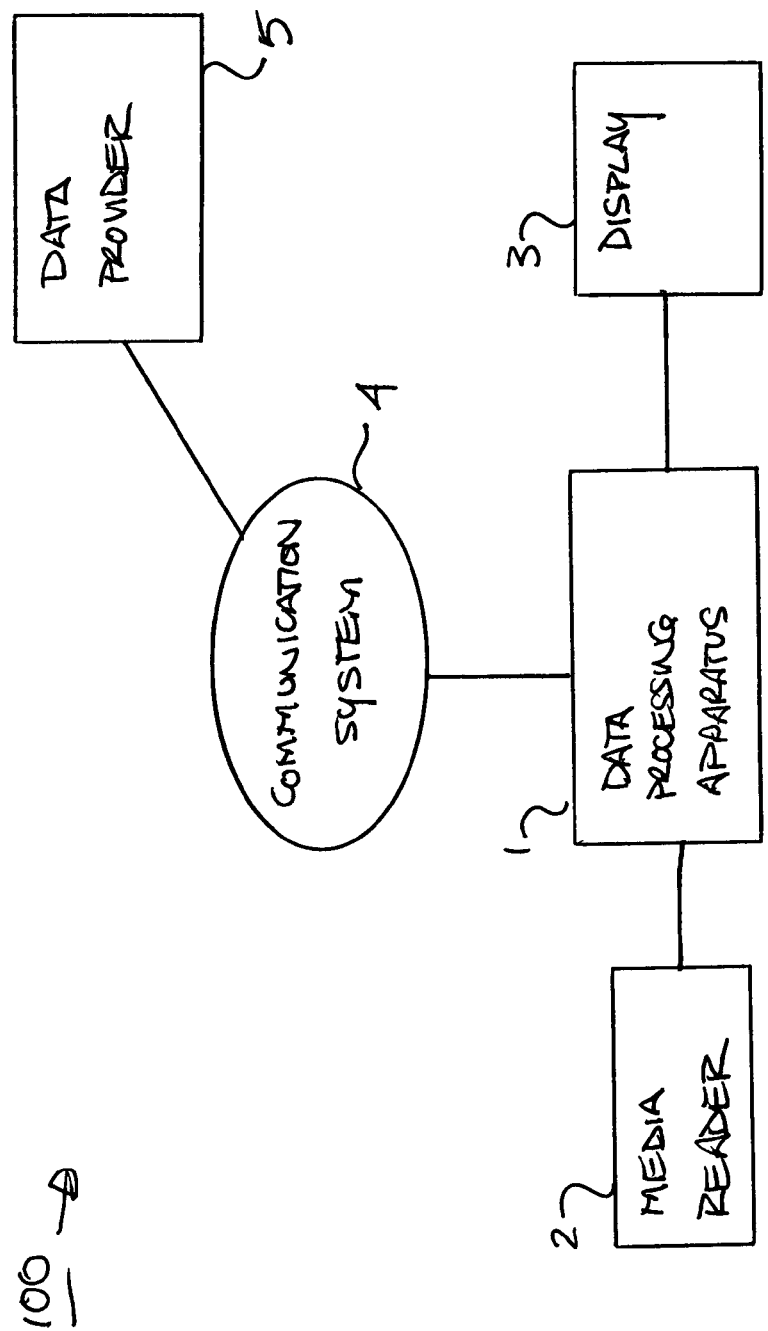
FIG. 1 is a schematic block diagram of a system that may be used with the present invention.

The present invention relates to controlling access to a storage medium, such as an optical disk. Aspects of the invention provide for copy protection as well as identification and use, such as writing data, of a storage medium, and/or encryption, distribution protection, or other use of data associated with a storage medium. For example, one aspect of the invention provides a method and apparatus for preventing the unauthorized reproduction of data recorded on an optical medium as well as limiting the distribution of data that may be distributed over a communications system, such as the Internet. Aspects of the invention may be practiced without alterations to readers and writers that are currently used with optical media such as CD-ROMs, Audio CDs, MO disks, and DVDs.

As one example, a CD may include a light sensitive material that is positioned in one or more positions on the CD. The light sensitive material may be alterable between two states, such as transparent and light emitting, to affect reading of data from the CD. The light sensitive material may be caused to change from a first state to a second state by being illuminated, such as by laser light from a CD reader, and then change from the second state to the first state without being illuminated. The light sensitive material may have some delay time between being illuminated and actually changing from the first to second state, e.g., changing from transparent to light emitting, so that data may be read from the CD before the light sensitive material changes to the second state. Thus, the delay time of the light sensitive material may be made longer than the read time (including oversampling) for a portion of the CD. Once the light sensitive material has changed to the second state, the material may remain in the second state, or have some persistence, for some time period, e.g., may remain light emitting for 1 ms or more. While the material is in the second state, the material may affect whether and how the CD is read, e.g., the material in the light emitting state may cause the reader to output a string of "0"s rather than output actual data positioned on the CD below the material, or may cause the reader to be unable to read the CD.

The light sensitive material may be used to verify that the CD is authentic, e.g., was obtained from a particular source and/or includes data authorized for particular use. For example, detection of the light sensitive material adjusting from a first transparent state to a second light emitting state after being exposed to light, such as laser light from a CD reader, may be used to perform an authentication test on the CD. The authentication test may include initially scanning the CD for light emitting regions (which are not found initially since the light sensitive material had not been exposed to light cause a change in state) followed by a subsequent scan for light emitting regions (which results in locating at least one light emitting region of light sensitive material that changed state in response to being exposed to light in the initial scan). Identifying a region of the CD that did not exhibit light emitting portion during an initial scan followed by identification of a light emitting portion in the region during a subsequent scan may be used to determine that the CD is authentic.

The above is only one illustrative example of one aspect of the invention, and other aspects of the invention are described below. For example, the light sensitive material may be alterable between states other than transparent and light emitting, such as invisible and visible, light transmissive and light absorbing, light emitting and non-emitting, and so on. The light sensitive material may be positioned on an optical medium to provide information, such as a code (like a barcode), actual readable data, and so on, or prevent sequential access to data on the medium, rather than only being detectable within specific regions. Thus, the light sensitive material may be used as part of a data encryption, watermarking or other protection scheme, in addition to providing an authentication feature.

"Optical Recording Medium" refers to a medium capable of recording digital data that may be read by an optical reader.

"Light sensitive Material" refers to a material that is alterable between at least two states when irradiated with light.

"Authentication Material" refers to a material used to authenticate, identify or protect an optical medium. The data recorded on an optical medium, for example, software, video or audio files, are not authentication material.

"Temporary Material" refers to material that is detectable for a limited amount of time or a limited number of readings.

"Re-read" refers to reading a portion of the data recorded on a medium after it has been initially read.

"Fluorescent Compound" refers to a compound that radiates light in response to excitation by electromagnetic radiation.

"Phosphorescent Compound" refers to a compound that emits light in response to excitation by electromagnetic radiation wherein the emission is persistent over a length of time.

"Recording Layer" refers to a section of an optical medium where data is recorded for reading, playing or uploading to a computer. Such data may include software programs, software data, audio files and video files.

"Recording Dye" refers to a chemical compound that may be used with an optical recording medium to record digital data on the recording layer.

"Security Dye" refers to a compound that may provide or alter a signal to protect the data on a storage medium.

"Non-Destructive Security Dye" refers to a security dye that does not render media permanently unreadable.

"Reader" refers to any device capable of detecting data that has been recorded on an optical medium. Examples are CD and DVD readers.

"Communication System" refers to any system or network for transferring digital data from a source to a target.

FIG. 1 is a schematic block diagram of a system 100 that may be used with various aspects of the invention. In this illustrative embodiment, the system 100 includes a data processing apparatus 1, which may be a general purpose computer, or network of general purpose computers, and other associated devices, including communications devices, modems, and/or other circuitry or components necessary to perform the desired input/output or other functions. The data processing apparatus 1 can also be implemented, at least in part, as a single special purpose integrated circuit (e.g., ASIC) or an array of ASICs, each having a main or central processor section for overall, system-level control, and separate sections dedicated to performing various different specific computations, functions and other processes under the control of the central processor section. The data processing apparatus 1 can also be implemented using a plurality of separate dedicated programmable integrated or other electronic circuits or devices, e.g., hard wired electronic or logic circuits, such as discrete element circuits or programmable logic devices, and can also include any other components or devices, such as user input/output devices, a keyboard, a user pointing device, touch screen, etc.

The data processing apparatus 1 may communicate with a media reader 2, which may be a conventional CD, DVD or other optical media reader. Optical media, which may include one or more aspects of the invention may be read by the media reader 2, and information regarding the reading provided to the data processing apparatus 1. The data processing apparatus 1 may also communicate with a display 3 that provides a representation of the data read by and provided from the media reader 2. The display 3 may be a computer monitor, a CRT or LCD display, one or more audio speakers, a printer, or any other device or combination of suitable devices. As one example, the data processing apparatus 1, the media reader 2 and the display 3 may all be incorporated into a single DVD player, such that a user can have a DVD read and played back using the display 3.

The data processing apparatus 1 may also communicate with a data provider 5 or any other device through a communication system 4, such as the Internet, a wired or wireless telecommunications network, an infrared communication system, and the like. The data provider 5 may include a general purpose computer, or network of computers, or other devices capable of communicating with the data processing apparatus 1.

Figure 2:
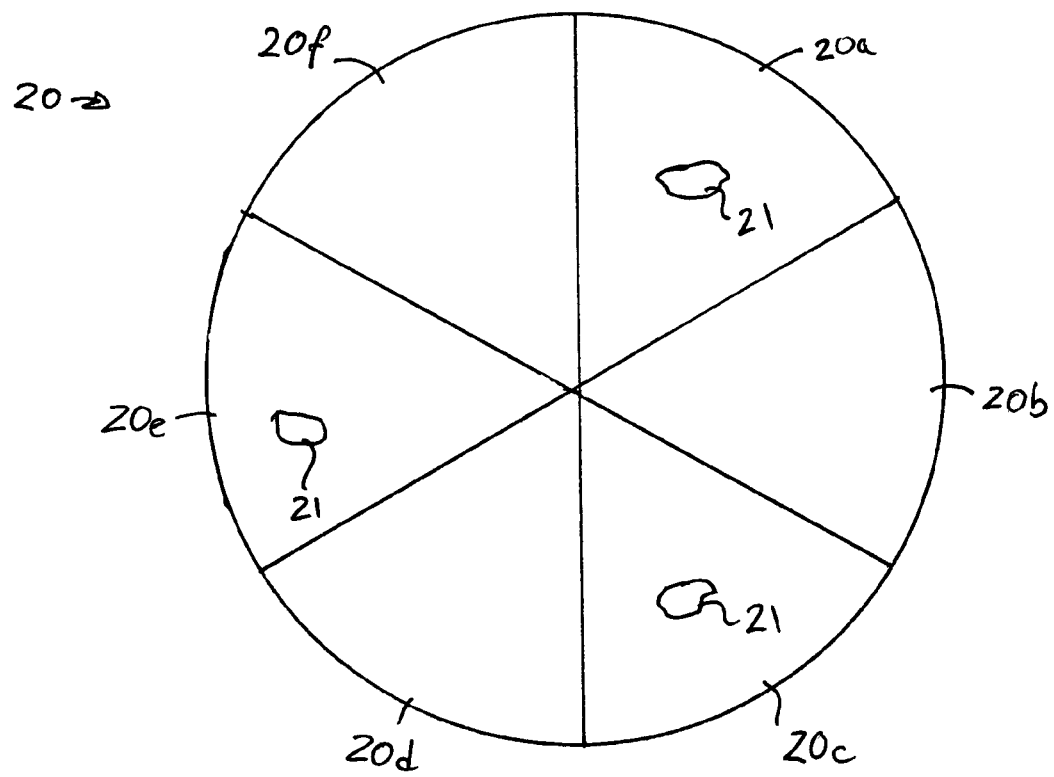
FIG. 2 shows an optical medium having light sensitive material positioned in or on the medium.

FIG. 2 shows a schematic diagram of an optical medium 20 in an illustrative embodiment of the invention. In this embodiment, the medium 20 includes a light sensitive material 21 that is positioned on the medium 20 in three different locations or spots. Although in this embodiment the material 21 is positioned in three different locations, the light sensitive material 21 may be placed on or in the medium 20 in any number of ways. In one embodiment, the entire medium 20 or one surface of the medium 20 may be coated with light sensitive material 21. In other embodiments, the material 21 is positioned at a number of discrete predetermined locations or in a random fashion. The light sensitive material 21 may be positioned so that it is located within precisely defined boundaries, or so that it is merely located roughly within a specified area. The shape and size of the areas of the medium 20 including light sensitive material 21 may not be important, as any underlying data may not be affected by the light sensitive material 21.

The light sensitive material 21 may be placed so that it lies in an optical read path of the media reader 2 so that the light sensitive material 21 is irradiated by light when the data is read. Alternately, the light sensitive material 21 may be placed in an area of the medium 20 that is not designed to hold recorded data or that includes dummy data that may not be required for use of other data on the medium 20. It should be understood, however, that the medium 20 need not include any data, but instead may be a "blank" medium 20 that can be written with desired data.

The light sensitive material 21 may be placed at any depth within the medium 20 between and including the surface of the medium 20 and an underlying data layer. For example, the light sensitive material 21 may be placed on the surface of the medium 20 through which light passes to read the underlying data. In another embodiment, the light sensitive material 21 is placed close to the recording layer of the medium 20 so that the focal distance to the light sensitive material 21 is similar to that of the recording layer. In another embodiment, the light sensitive material 21 is placed on the surface of the medium 20 and is then coated with a protective layer.

In addition to the size and shape of the placement, other factors may determine how a light sensitive material 21 may be illuminated to an extent great enough to change state. For example, the depth of the placement of the light sensitive material 21 within the medium 20 may be a factor in determining when a light source will be properly positioned to illuminate the material 21 to an extent necessary to provide a detectable response, i.e., change in state. For example, if polycarbonate is used as a substrate material of the medium 20, the polycarbonate substrate may act as a lens to focus a light beam so that the beam becomes more focused at locations closer to the underlying data track than near the surface of the polycarbonate opposite the data track. Therefore, an equally sized and shaped placement of light sensitive material 21 near the surface of the medium 20 may be illuminated during reading of a broader range of underlying addressable data points than would be if the light sensitive material 21 were positioned in the substrate closer to the data track or the focal point of the light source. This may occur because the light beam is broader and less focused, covering more area, when it strikes the surface of the medium opposite the data layer, rather than when it is focused near the data layer. This may also result in a lower beam intensity at the surface of the medium than at the data layer and, accordingly, light sensitive material 21 placed close to the surface of the medium may be made denser or more sensitive in order to provide an adequate response.

The light sensitive material 21 may be positioned in or on the medium 20 by any number of methods including direct application, spin coating, molding the light sensitive material 21 into a substrate of the medium 20, and dispersing the light sensitive material 21 in a second material that is compatible with the medium 20 substrate. For example, the light sensitive material 21 may be dispersed in a prepolymer of polycarbonate, PVC or vinyl acetate and then fixed in a suitable pattern on the medium 20. The chosen light sensitive material 21 may exhibit long term stability under typical optical media storage conditions and may be light fast and non-reactive. In addition, materials 21 may be chosen based on compatibility with the polymer or other material that is used to produce a substrate for the medium 20. The light sensitive material 21 may be included with the medium 20 before, during or after data has been written or otherwise provided on the medium 20.

The light sensitive material 21 may be any material that is affected by light, for example, by becoming reflecting, absorbing or emitting when illuminated by a light source. The light source may be a data reading light, such as a media reader 2 laser or other light source. The light sensitive material 21 may change between two or more states. For example, the material 21 may be alterable between emissive and non-emissive states, absorbent and non-absorbent states, or reflective and non-reflective states. The material 21 may alter states when excited by a light source, such as a laser, and later change states again with or without any further illumination. Thus, the light sensitive material 21 may change from a first state to a second state after illumination, and later change from the second state to the first state without being illuminated again.

The light sensitive material 21 may also have a delay in its change from one state to another after being illuminated. For example, the material 21 may be non-emissive for a delay period after excitation by a light source and then may become light emissive after the delay. For example, the material 21 may be light absorbent upon illumination, and after a delay period become light emissive. In another embodiment, the light sensitive material 21 may emit light at one wavelength in a first state and then, after additional excitation, emit light of a different wavelength in a second state.

The light sensitive material 21 may have persistence, e.g., a time period during which the light sensitive material 21 remains in an altered state (e.g., light emitting) before changing to another state (e.g., transparent) absent sufficient illumination or other excitation while in the altered state. The persistence may vary widely, e.g., from 1 nanosecond to 1 minute or more. For example, a light sensitive material 21 may switch from a first state to a second state after being illuminated by an appropriate light, and remain in the second state for its persistence time, e.g., 1.6 ms, before changing back to the first state (absent sufficient illumination or other excitation while in the second state).

The medium 20 may include data for digital files, such as data sets, computer programs, sound, images and video. The light sensitive materials 21 may be applied to the medium so that the presence of the materials 21 may or may not be detected during an initial reading or in a single read operation using conventional oversampling. If the materials 21 are chosen so that their presence cannot be detected during a single read using oversampling, e.g., the delay time is greater than the total read time including oversampling, the reader 2 may be directed to reread the same area of the medium 20 a short time after an initial read, and the light sensitive material 21 may have changed states.

Although light of a different wavelength and intensity than that used in conventional optical media readers 2 may be employed to illuminate the light sensitive material 21, it may be advantageous to used light sensitive compounds that respond to light sources that are used in conventional readers. In addition, it may be preferable that the light sensitive compounds are detectable by conventional readers 2. However, the light sensitive material 21 may be replaced with other materials that change state when exposed to a signal other than light, such as an electric or magnetic field, a rise in local temperature, etc. One example may be a material that changes state in response to a rise in local temperature, e.g., caused by the reading light of an media reader 2 or other heat source, such that the state change can be detected by the reader 2 light.

Having described some of the ways in which a light sensitive material 21 may be provided in association with an optical medium 20, examples regarding how the light sensitive material 21 may be used in a few illustrative embodiments are described. It should be understood that various aspects of the invention described above and/or in the following Examples may be used singly or combined together in various ways in a single device or application.

EXAMPLE 1

In one illustrative embodiment, the presence of light sensitive materials 21 on a medium 20 is used to determine that the medium 20 is an authorized medium 20 and/or contains data authorized for a particular use. In this embodiment, the light sensitive material 21 on the medium 20 is used by an installation program to prevent unauthorized installation of software recorded on the medium 20 on a computer, but the same or similar technique may be used to prevent unauthorized use of the medium 20, unauthorized use, such as reading or writing, of data on the medium 20, and so on. In this example, the installation program along with data representing the software code are recorded on the medium 20, but the installation program may be provided in other ways, such as stored in a memory of a media reader 2, on another medium 20, etc.

When an attempt is made to install the software on the medium 20 shown in FIG. 2, the installation program is read from the medium 20, e.g., by the media reader 2, and implemented by the data processing apparatus 1. The installation program includes instructions to verify that the software to be installed is contained within an authorized medium 20. Part of the authentication procedure may involve reading portions of the medium 20 in a defined sequence and/or at a defined timing. The read sequence and timing may be stored as part of the installation program or may be determined randomly, e.g., by the program using a random number generator. For example, the installation program may direct the media reader 2 to read portions of the medium 20 within sectors 20a-20f in order during a first read. Depending upon the nature of the light sensitive material 21, the reader 2 may not detect the presence of the light sensitive material 21 during the first read, and output a signal representing the read result. The reader 2 may not detect the light sensitive material 21 if, for example, the delay time of the material 21 is longer than the read time for each sector 20a-20f. As discussed above, the light sensitive material 21 may be positioned on the medium 20 in association with actual target or useable data, such as portions of the software program, or in association with dummy data. Thus, the reader 2 may output a signal representing dummy data read from each of the sectors 20a-20f after the first read. For simplicity and as one example, the reader 2 may output a signal "000000", where each "0" represents the dummy data read from each of the six sectors 20a-20f during the first read.

Next, the installation program may instruct the media reader 2 to again read the sectors 20a-20f in that order during a second read. Each sector 20a-20f is to be read at a timing such that the second read of the sector 20a-20f occurs after a delay time (if any) and within a persistence time for the light sensitive material 21. That way, assuming the first read of each portion of sector 20a, 20c and 20e was sufficient to illuminate the light sensitive material 21 and cause the material to change state, the second read will be performed while the light sensitive material 21 is in its changed state. Since the light sensitive material 21 is in its changed state during the second read cycle, the media reader 2 will output a signal representing a read where the light sensitive material 21 in its changed state was encountered. For example, the media reader 2 may output a signal "101010" for the second read, where the "1"s represent a read where light sensitive material 21 in a changed state was encountered in sectors 20a, 20c and 20e and the "0"s represent a read dummy data read in sectors 20b, 20d and 20f. Reading of sectors 20a, 20c and 20e during the second cycle may result in the media reader 2 reading different data than that during the first read, e.g., the dummy data under the light sensitive material 21 may include a string of "0"s while the light sensitive material 21 during the second read cycle may cause the reader 2 to read a string of "1"s. The light sensitive material 21 may have other affects on the reading of the medium 20 during the second read cycle, such as causing the reader 2 to output an "end of file" signal, a signal indicating that the medium 20 is not readable, or some other indication of the light sensitive material 21 being in an altered state.

By comparing the two signals generated during the first and second read cycles, e.g., determining that the two reads provided different results from reading the same portions of sectors 20a-20f, the installation program may determine that the medium 20 is an authentic medium (as opposed to an unauthorized copy) and allow installation of the software program to continue. Otherwise, the installation program may deny installation of the program.

The installation program need not necessarily require a precise match between an expected output from a media reader 2 during an authentication process and the actual output. Instead, the installation program may only require that the actual output from the media reader 2 be within a desired range of values. Using a simplified extension of the example above, light sensitive material 21 may be provided in any one of the sectors 20a-20f during manufacture, as long as at least one sector includes light sensitive material 21. In this case and using the example provided above, the installation program may accept actual output from the media reader 2 during the second read cycle between the range "000001" and "111111" are acceptable for authentication purposes.

Since a relatively large area of each sector 20a-20f may be read during authentication, precise positioning of the light sensitive material 21 within each sector may not be required. Instead, approximate positioning may be adequate. In addition, the medium 20 may be conceptually divided into more than, or fewer than, six sectors 20a-20f, if desired. An increase in the number of sectors may provide a larger number of possible locations for light sensitive material 21, and therefore provide a more complicated and robust protection scheme. Further, each medium 20 may have a unique distribution of light sensitive material 21 in its sectors as compared to other media 20 in a group. Thus, a unique code may be provided on each medium 20 using the light sensitive material 21 positioned in different locations. Protection may be further enhanced by varying the delay times and/or persistence of light sensitive materials 21 positioned on the medium 20.

EXAMPLE 2

Those of skill in the art will appreciate that Example 1 described above may be altered in many ways to provide different and/or varying levels of protection. As a second example, authentic media 20 may be provided with an alphanumeric security code that is unique to each disk and is printed on a card accompanying the media 20. At the time of installation, the installation program may request the user to enter the security code. The installation program may then use the code to verify the authenticity of the medium 20 having the software to be installed. For example, the installation program may use the security code to determine a sector 20a-20f read sequence and/or timing, as an encryption key or password, to determine where on the medium 20 light sensitive material 21 is positioned, to determine an expected output from the media reader 2 when using a predefined sector read sequence, and so on. Based on this information, the medium 20 may be read, and the output from the reader 2 compared to expected output determined based on the security code.

The security code may alternately be included on the medium 20 based on the way the light sensitive material 21 is positioned on the medium 20, e.g., in a way similar to a conventional barcode, and/or other features of light sensitive material 21, such as a delay time and/or a persistence for each spot of light sensitive material 21. As one example, the installation program could instruct the media reader 2 to initially read the medium 20 in a way that the presence and location of light sensitive material 21 on the medium 20 is determined. If other features of delay and/or persistence of the light sensitive material 21 are used to encode the security code, the installation program could then read the light sensitive material 21 locations in various ways to determine the delay and/or persistence of the material 21 and use that additional information to determine a security code and/or authenticate the medium 20. For example, the installation program could instruct the media reader 2 to read each location of light sensitive material 21 using different read delay times of 1 ms, 10 ms and 100 ms. If a change in state of the light sensitive material 21 is detected after a delay time of 10 ms, but not after 1 ms and 100 ms, a determination may be made that the delay time of the light sensitive material 21 is between 1 ms and 10 ms, and the persistence is less than 99 ms. This information, along with position information regarding the material 21 location, may be used to determine/decode a security code, a medium identification number, an alphanumerical sequence or other information provided by the pattern of light sensitive material 21 on the medium 20. Decoded information may be used to determine characteristics of the medium 20 and compare those characteristics to characteristics sensed during the authentication process. For example, a decoded medium identification number may be used to determine, e.g., using stored information, that the medium 20 should include light sensitive material 21 in specific locations, and having specific delay times and/or persistence. This information may be compared to the sensed location, delay time and persistence values determined during reading of the medium 20. The comparison may result in determining that the medium 20 is authentic and authorized for use (reading, writing, alteration of data on the medium 20 and so on), or that use of the medium 20 should be denied.

EXAMPLE 3

Figure 3:
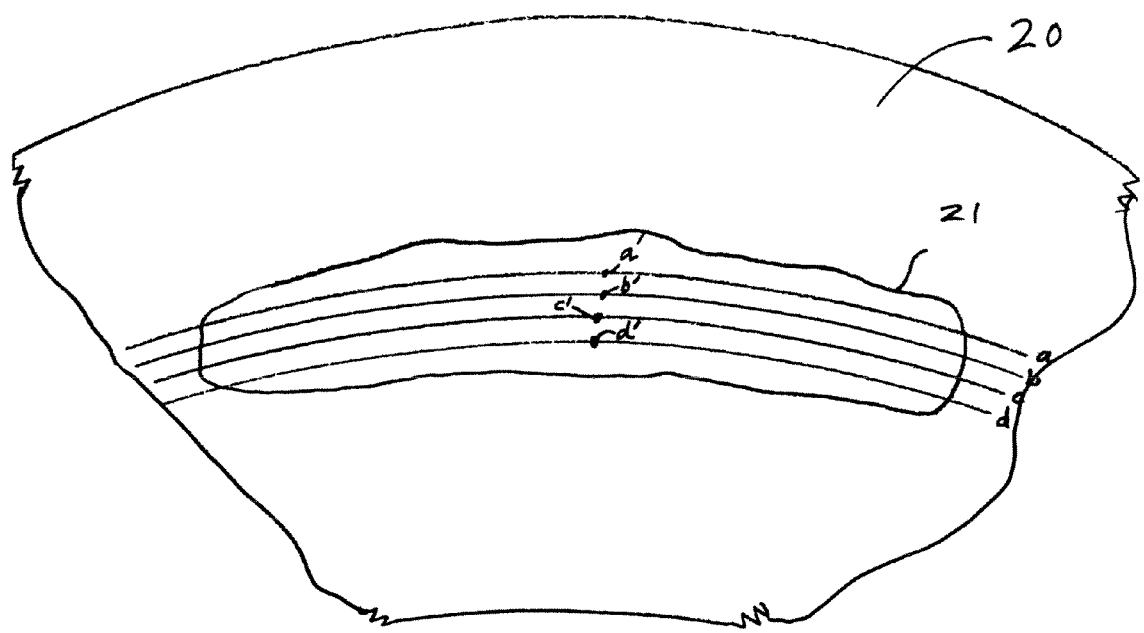
FIG. 3 shows a portion of an optical medium having a spot of light sensitive material associated with four data tracks.

In the examples described above, no distinction was made regarding reading specific portions of a medium 20 that is associated with a single spot of light sensitive material 21. In this illustrative embodiment of the invention, different portions of a medium 20 that are associated with a single spot of light sensitive material 21 are read. FIG. 3 shows a portion of the medium 20 and a spot or area of light sensitive material 21. Although the medium 20 may have a plurality of regions each associated with a corresponding spot of light sensitive material 21, only the reading of a single portion of the medium 20 is discussed below for simplicity. In addition, the light sensitive material 21 is associated with four tracks a-d in FIG. 3, but light sensitive material 21 may be placed in or on a medium 20 so that it is associated with any number of adjacent tracks.

Part of an authentication procedure for the medium 20 may involve reading a plurality of tracks a-d on the medium 20 that are all associated with a spot of light sensitive material 21. The location of spots of light sensitive material 21 may be determined as described above, e.g., by searching the medium 20 for regions, by referring to a look up table that corresponds a medium identification number with specific, expected material 21 locations, and so on. Reading of the tracks a-d may be performed for the same or similar purpose as reading portions of the medium 20, such as determining a security code for the medium 20, verifying the presence of light sensitive material 21 on the medium 20 (e.g., in specific locations, and/or having specific properties such as delay time and persistence), and so on. However, in this embodiment, if any point along tracks a, b, c or d that are associated with the light sensitive material 21 are read by a light source, the light sensitive material 21 may be caused to alter state. That is, illumination of any of the tracks a-d for reading may illuminate the light sensitive material 21 and cause it to change from one state to another. For example, if the reader 2 is directed to sample a section of track a, and light sensitive material 21 is a fluorescent compound having a delay time of 10 ms, then reading of track a, b, c or d 10 ms after illumination during the first read may result in the reader 2 detecting the presence of the light sensitive material 21, since illumination of a portion of the light sensitive material 21 may cause the entire spot of the material 21 to change state.

However, if the response of the light sensitive material 21 is different, e.g., only illuminated portions of the light sensitive material 21 change state, the reading of track a may cause only a portion of the light sensitive material 21 associated with an adjacent track(s) to change state (in addition to the portion associated with track a). This may be caused as a result of the light beam reading track a covering an area larger than that defined by the target track a, e.g., the light sensitive material is in a different focal plane that the track. Thus, the light beam may illuminate portions of the light sensitive material 21 that is associated with track b, but not portions associated with track c or d. In addition, the light sensitive material 21 may be excited by light beams used to aid in tracking as well as the light beam used for reading data. These additional light beams may further broaden the area of light sensitive material 21 that may be excited by a single read. As a result, reading of track a, followed by reading of track b after the delay time (if any) and within the persistence time of the light sensitive material 21 may result in the media reader 2 detecting that the light sensitive material 21 is in a changed state when reading track b.

As one example, the media reader 2 may be directed to read track a, track b, track d, then track c. Given that the readings occur within an amount of time greater than the delay of the light sensitive material 21 and during the persistence time, the reader 2 will read data unaffected by the material 21 from track a, detect that the light sensitive material 21 is in an altered state while reading track b, read data unaffected by the material 21 from track d, and detect that the material 21 is in an altered state while reading track c. Of course, reading of tracks a-d may be performed in any suitable order, and with any delay. The result of the reading may be used as discussed above, to authenticate the medium 20, to determine a security code, identification number or other information for the medium 20, and so on. In addition, the light sensitive material 21 need not be precisely positioned with respect to the tracks a-d. In fact, imprecise or random placement of the material 21 may be used to create unique patterns of material 21 on each medium 20. By including material 21 at multiple spots with light sensitive material 21, a sophisticated read sequence may be required to accurately obtain the underlying data. If the proper read sequence is followed, the data may be used for its intended purpose. However, if an improper read sequence is used, for example, if the reader simply proceeds along the tracks in a sequential fashion, the material 21 will interfere with the reading of the underlying data resulting in an inoperable data set.

As with the other examples described above, the areas of light sensitive material 21 may be made large enough to avoid error correction techniques, such as EFM, from masking detection of the material 21 in an altered state. For example, to prevent masking of error correction techniques, the material 21 may be placed over 50,000 or 100,000 adjacent bits of data, or over approximately 2 mm on a conventional CD. Therefore, only when the required read sequence, including appropriate jumps and delays, is implemented will the underlying data be properly read from the medium 20.

This same feature that one or more tracks may be made unreadable by previous reading of an adjacent track can be used to prevent serial copying of data on a medium 20 or copying of data on the medium 20 while not using an appropriate reading sequence (which may involve reading different regions at different times to account for the location, delay and/or persistence of light sensitive material 21 on or in the medium 20). For example, an entire medium 20 may be coated with a light sensitive material 21 so that data stored on the medium 20 cannot be sequentially read from medium 20 unless a first portion is read, thereby causing the light sensitive material 21 to alter state, and a next adjacent portion associated with the material 21 that has changed state is read after the material 21 has reverted back to its unaltered state. Reading of the medium 20 sequentially without appropriate timing may result in unusable data being read from the medium 20 caused by the media reader 2 reading light sensitive material 21 that is in an altered state.

Similarly, light sensitive material 21 and data may be positioned in strategic locations on the medium 20 so that the data may only be successfully read when the data is accessed using a particular access sequence. The access sequence may be stored as part of the data on the medium 20 (and possibly encrypted), provided by a user as an alphanumeric code, and/or stored/encoded by the location, delay and/or persistence of the light sensitive material 21 on the medium 20, similar to that described above.

As with the other examples, various combinations of materials 21 exhibiting absorbence, emission, and reflectance, for example, may be used. In addition, compounds exhibiting various delay times and persistence times may be used together to create a more sophisticated protection system. If the disk is copied, for example, by bit-to-bit copying, the light sensitive materials 21 may not be copied, and thus the copied version of the data will be uninstallable, unreadable or otherwise unusable. This will hold true whether or not the user of the unauthorized copy has access to the user code or owns an authorized copy.

EXAMPLE 4

Using another aspect of the invention, optical media 20, such as CDs and DVDs, may be read only for a limited amount of time or a limited number of readings. For example, the medium 20 may include light sensitive material 21 that will fade or otherwise be undetectable after a certain amount of time, e.g., one month, or after a certain number of readings, e.g., after three readings. The light sensitive material 21 may be used in any of the ways described above, e.g., applied in spots on the medium 20 and used to authenticate the medium 20. After the material 21 fades or is otherwise undetectable, data on the medium 20 will no longer be accessible. Alternately, the material 21 may be used to encode actual useable data on the medium 20, e.g., data portions of a DVD movie, and after the material 21 is no longer detectable, the medium 20 will effectively be blank or partially so. This type of temporary medium 20 may be useful in the movie or software rental industry, because the medium 20 will no longer be useable to the renter after authorized use of the medium 20 and/or its content is complete.

For example, the light sensitive material 21 may be a persistent light sensitive compound placed at a specific location on the medium 20. The persistence of the material 21 may be known to decrease with age, or use, such that after three plays the persistence decreases from 2 ms to less than 1 ms, for example, at a detectable intensity. Therefore, prior to allowing the medium 20 to be accessed, the location at which the light sensitive compound 21 has been placed is read and then re-read after about 1 ms. If a response is detected from the light sensitive material 21 upon re-reading, the persistence is still greater than 1 ms, and reading of the data may proceed. If no response from the light sensitive material 21 is detected, the persistence time has dropped below the acceptable level and access to the data is denied. In this manner, by varying the amount of time from initial read to re-read, the same medium 20, with the same light sensitive material 21 in the same location, may be provided with different useful lifetimes. For instance, data access may be provided or denied based on threshold re-reading times of 1.5, 1.0 or 0.5 ms, with 1.5 ms corresponding to a medium 20 that is one month old, 1.0 ms corresponding to a medium 20 that is 3 months old, and 0.5 ms corresponding to a medium 20 that is a year old.

In addition to providing only a limited number of uses, the medium 20 may also incorporate copy and/or access protection techniques, such as those used in the examples above. For instance, phosphorescent compounds may be placed at various points on the medium 20 and persistent readings must be detected from these locations prior to proceeding with playing the disk. In this manner, a copy protected temporary data file capable of only a limited number of uses is provided.

EXAMPLE 5

In another embodiment of the invention, an optical medium 20, such as a CD or DVD, may contain a version, or portion, of a movie, audio file, program or data file that may be freely used and duplicated. For example, this may be a demo version of a piece of software or the trailer of a movie. The optical medium 20 may also contain an access protected file which may include, for example, the entire software program or the full length DVD movie. In order to access the full version of the program, movie or audio file, the user must input a code which can be obtained from an authorized source and may be specific for a particular optical medium 20. Once the code has been input, the proper installation sequence or reading sequence may be implemented, e.g., the expected position and type of light sensitive material 21 on the medium 20 verified, and the full version of the data can be accessed. In addition to limiting access, the invention may be used to prevent copying in a manner similar to those outlined above. Thus, even after an owner is provided with an access code, additional functional copies may not be made.

EXAMPLE 6

Another aspect of the invention may allow data files, such as movies, software and music, to be safely transmitted over the Internet and recorded onto an optical medium 20 where an authorized user may have full access to the content.

For example, a "blank" optical medium 20 may be provided (either "free" or purchased) with a data recording layer and light sensitive materials 21 associated with various portions of the medium 20. The pattern of light sensitive material 21, for instance, a phosphorescent compound, may be unique to this particular medium 20 or to a small group of media 20. A user of the medium 20 can contact a data provider 5 of content using a data processing apparatus 1 over a communication system 4, such as the Internet, and request a particular data set, such as a DVD movie or software. When the user decides to purchase or rent the content, for example, a movie, a unique code for the medium 20 may be detected by the media reader 2 that is specific to the pattern of light sensitive material 21 on the medium 20. The media reader 2 may determine the code by reading the medium 20 using read instructions received from the provider 5, using instructions stored on the medium 20, using a set of standard read instructions, and so on. This unique code may then be transmitted to the data provider 5. Alternately, the user could provide a code, such as a serial number or other identifier, for the medium 20 by typing the code into the data processing apparatus 1 and sending the code over the communication system 4.

Based on the code, the data provider 5 may create a protected version of the requested data. The protected or encrypted version of the movie may be inoperable in the form in which it is transmitted from the provider 5 to the user. Thus, if the file sent by the provider 5 is intercepted during transmission, the file will not be useable unless associated with the appropriate medium 20. Because the code that was transmitted to the provider 5 provides information about the pattern of light sensitive material 21 on the medium 20, the encrypted file that is transmitted may be uniquely produced to work only on the specific medium 20. Thus, only when the data is recorded onto the unique medium 20 may the file become usable. Once the data has been written to the medium 20, it may be used an unlimited number of times if a permanent data recording technique has been used, or alternatively, a temporary recording surface or light sensitive material 21, such as that described in Example 4 above, may be used to produce a medium 20 capable of a limited number of plays.

Because the medium 20 may require the presence of light sensitive material 21 in particular locations, having a particular delay and/or persistence to be accessible, byte-to-byte copying of the medium 20 may result in an inoperable data file. In this manner, a producer or distributor of copyrighted material may either charge for the blank medium 20 or charge for the download and can be confident that only a single copy of a content will be made and used. In an alternative embodiment, a medium 20 having a unique code of light sensitive material 21 may be used as a key to unlock an encrypted file on another medium 20 and the unlocked complete file may be copied onto a second disk that includes copy protection features, such as those described above. In this way, a single unique disk can be used to download multiple movies, songs or programs allowing for efficient accounting and billing methods.

The light sensitive material 21 may be used in different ways to allow access to the data stored on the medium 20. For example, the data transmitted by the provider 5 may have 1000's of inborn errors that are corrected by the light sensitive material 21, e.g., when the data is written to the medium. That is, the data may be constructed so that the error portions of the data are written on the medium 20 in portions that are associated with spots of the light sensitive material 21. Thus, using an appropriate read sequence and/or timing, the material 21 may be altered in state so that the incorrect data is masked or corrected by the material 21 during reading. For example, the material 21 may have a delay time that is less than half the total time required to read data from the medium using oversampling. This results in the read of the material 21 providing corrected data while masking the incorrect data. Of course, the delay time may be longer than a single read time using oversampling. In this case, the material 21 may have to be altered in state before being read to provide corrected data. In this embodiment, the material 21 may be configured or chosen so that the data may be written on the medium 20 without altering the state of the material 21, e.g., the delay time of the material 21 is less than the write time. This way, the data may be written to the medium 20 without interference from the material 21.

Alternately, the material 21 may provide information regarding which data portions contain errors and how to correct the errors. For example, before or during reading of the data, the data processing apparatus 1 and/or the media reader 2 may identify which areas of the medium 20 contain light sensitive material 21 (based on a detected change in state) and cut out data portions located in those areas or otherwise process the incorrect data. By using thousands of spots of material 21 arranged in a unique pattern on each medium 20, manual or automatic correction of the data in an attempt to make an unauthorized copy may be made very difficult or impossible.

Another possibility is to store encrypted data on the medium 20 and use a decryption key that is determined based on characteristics of the light sensitive material 21 on the medium 20 to decrypt the data. For example, a pattern of light sensitive material 21 on the medium 20 may provide an encryption key when read in a particular way, e.g., in a specific sequence, at a specific timing and so on. This key can be used to decrypt the data, e.g., in real time during play back, or authorize use of the data on the medium 20.

The material 21 may also provide a watermarking function such that reading of the data on the medium 20 using an improper accessing sequence, e.g., a sequential copy sequence, may result in including data read from material 21 in an altered state being included in the copy. This data, which is different from data included in an authorized copy, may provide a kind of watermark that can be used to identify that the copy is an unauthorized one, and/or the source of the copied data.

A variety of techniques are available for implementing different aspects of the invention. For instance, the output of underlying data may be altered by the presence of a light sensitive material. Methods and apparatus to apply a version of this technique, and others, are described in co-owned U.S. patent application Ser. No. 09/608,886, filed Jun. 30, 2000, and hereby incorporated herein by reference in its entirety.

Light sensitive materials 21 have been chosen and described for use in the examples above, in part, because of the current popularity of optical storage media and because they may provide a convenient way of protecting stored data without requiring alteration of conventional optical media readers. It should be understood, however, that various aspects of the invention may be extended to use of other types of materials, such as materials that change state or otherwise respond to signals other than light, or other types of storage media. For example, materials that change state in response to an electric or magnetic field may be used in place of the light sensitive materials 21. The materials may be used in media that are optically read, or in media that are read using other signals. As one example, a material that changes state in response to an electric field and effects light in different ways based on its state, such as a liquid crystal material that changes state in response to an electric field and alters the polarization of light passing through the material, may be used in place of, or in addition to, the light sensitive materials 21. In such cases, media readers may have to be altered to accommodate the different type of material, e.g., by including a device to create an electric field at desired locations on the medium 20. Thus, the invention is not limited to the use of light sensitive materials, or to application to optical storage media only.

In addition, in the examples described above, the light sensitive materials 21 affect reading of a medium 20 after being exposed to light and changed to an altered state. However, the materials 21 may operate to affect reading of the medium 20 in a first state and not affect reading in a second state. For example, a material 21 may be light absorbing prior to being illuminated by an optical reading light. After a possible delay time, the material 21 may change state to be transparent such that the material 21 allows reading of data under the material 21. After some persistence time, the material 21 may return to the first absorbing state, thereby preventing reading of data under the material. Further, the light sensitive material 21 may affect reading of data on the medium in two or more of its states. For example, the material 21 may always prevent reading of data under the material 21 as long as the material 21 is detectable. In a first state, the material 21 may cause a reader to read a first data type, such as a "0", and in a second altered state may cause the reader to read a second data type, such as a "1". The material 21 may be temporary such that after an amount of time or a number of readings the material 21 is no longer detectable, thereby allowing data below the material 21 to be read.

The light sensitive materials used in the applications discussed above may be chosen from a group of dyes, specifically, cyanine dyes. These cyanine dyes include, among others, indodicarbocyanines (INCY), benzindodicarbocyanines (BINCY), and hybrids that include both an INCY and a BINCY. Hybrids may be, for example, mixtures of two different dyes or, in another embodiment, compounds that include both INCY and BINCY moieties. In one embodiment, the light sensitive material may be a ratiometric compound having a linked structure with excitation ranges at both the CD and DVD ranges of about 530 and 780 nm. In a further embodiment, the dye is phosphorescent, having a time delay of about 10 milliseconds and a persistence of several seconds. Table 1 provides some of the dyes that may be useful with some aspects of the invention.

TABLE 1

| Dye Name/No. | CD/DVD | Excitation | Emission |
|---|---|---|---|
| Alcian Blue (Dye 73) | DVD | 630 nm | Absorbs |
| Methyl Green (Dye 79) | DVD | 630 nm | Absorbs |
| Indocyanine Green (Dye 77) | CD | 775 nm | 818 nm |
| Copper Phthalocyanine (Dye 75) | CD | 795 nm | Absorbs |
| IR 140 (Dye 53) | CD | 823 nm(66 ps) | 838 nm |
| IR-768 Perchlorate (Dye 54) | CD | 760 nm | 786 nm |
| IR 780 Iodide (Dye 55) | CD | 780 nm | 804 nm |
| IR 780 Perchlorate (Dye 56) | CD | 780 nm | 804 nm |
| IR 786 Iodide (Dye 57) | CD | 775 nm | 797 nm |
| IR 768 Perchlorate (Dye 58) | CD | 770 nm | 796 nm |
| IR 792 Perchlorate (Dye 59) | CD | 792 nm | 822 nm |
| 1,1'-dioctadecyl-3,3,3',3'-tetramethylindodicarbocyanine perchiorate (Dye 231) | DVD | 645 nm | 665 nm |
| 1,1'-dioctadecyl-3,3,3',3'-tetramethylindo tricarbocyanine Iodide (Dye 232) | DVD | 748 nm | 780 nm |
| 1,1',3,3,3',3'-hexamethyl indodicarbocyanine Iodide (Dye 233) | DVD | 638 nm | 658 nm |
| DTP (Dye 239) | CD | 800 nm(33 ps) | 848 nm |
| HITC Iodide (Dye 240) | CD | 742 nm(1.2 ns) | 774 nm |
| IR P302 (Dye 242) | CD | 740 nm | 781 nm |
| DTTC Iodide (Dye 245) | CD | 755 nm | 788 nm |
| DOTC Iodide (Dye 246) | DVD | 690 nm | 718 nm |
| IR-125 (Dye 247) | CD | 790 nm | 813 nm |
| IR-144 (Dye 248) | CD | 750 nm | 834 nm |

Having thus described certain embodiments in the present invention, various alterations, modifications, and improvements will readily occur to those skilled in the art. Such alterations, modifications, and improvements are intended to be within the spirit and scope of the invention. Accordingly, the foregoing description is by way of example only, and is not intended to be limiting. The invention is limited only as defined in the following claims and the equivalents thereof.

What is claimed is:

1. A data storage medium comprising:
   a structure adapted to support data which is optically-readable by an optical reader;
   a material associated with said structure adapted to support data, said material characterized by displaying at least two different optical states to an optical reader, a first of said optical states occurring prior to exposure to an activating radiation and a second optical state after exposure to said activating radiation;

a software instruction set comprising code preventing read of one or more portions of said structure of data unless an optical change of said material from said first optical state to said second optical state occurs on said data storage medium.

2. The data storage medium of claim 1, wherein said material is a light sensitive material.

3. The data storage medium of claim 1, wherein said second optical state is a state in which reading of the data encoded in the data structure associated with the material is affected as compared to reading of such data when the material is in its first optical state.

4. The data storage medium of claim 1, wherein said activating radiation is electromagnetic radiation.

5. The data storage medium of claim 1, wherein the data storage medium is an optical disc.

6. The data storage medium of claim 1, wherein said material is a cyanine dye.

7. The data storage medium of claim 1, wherein the material has a delay time in conversion of said first optical state to said second optical state after absorption of said activating radiation that, is greater than about 1 millisecond.

8. The storage medium of claim 7, wherein said delay time is less than a time required to read data supported by the data structure of data by an optical reader using oversampling.

9. The storage medium of claim 7, wherein said delay time is greater than a time required to read data supported by the structure of data by an optical reader using oversampling.

10. The storage medium of claim 1, wherein said material transiently changes from said first optical state to said second optical state upon exposure to said activating radiation with a persistence of greater than one nanosecond during which said material remains in said second state before changing back to said first optical state.

11. The storage medium of claim 1, wherein said material is positioned in or on one or more discrete area(s) of said structure of data.

12. The storage medium of claim 11 wherein when said structure of data comprises a plurality of pits and lands, said discrete area(s) comprise less than each pit and/or each land of said structure of data.

13. The storage medium of claim 11, wherein at least one of said discrete areas comprises material having a delay time and a persistence such that the discrete area presents two different data reads of said structure of data at said discrete area to said optical reader depending on whether said material is in said first optical state or in said second optical state.

14. The storage medium of claim 13, wherein said two different data reads, and/or transition between the same, may be used to at least one of: authenticate said structure of data, decrypt data supported by said structure of data, correct data read from said structure of data, and provide a watermark in data copied from said structure of data.

15. The storage medium of claim 1, wherein said material is temporary such that said material is not detectable in one of said first and second optical state after a certain amount of time or number of times that the material is exposed to said activating radiation.

16. The storage medium of claim 1, wherein at least some of said material is disposed at different depths at different locations in the data storage medium.

17. The storage medium of claim 1, wherein said software instruction set uses the detection of said material to prevent unauthorized access to data supported by said structure.

18. The storage medium of claim 17, wherein said optical data both supports data that is freely accessible, and supports data that may be accessed only if said material is detected.

19. An optical recording medium comprising:

a recording medium;

a plurality of areas in or on said recording medium providing for distinctly different optical characteristics readable by an optical reader, said plurality of areas encoding data which is convertible by a processor coupled to said optical reader into data; and a material capable of existing in a first optical state and a second optical state disposed on at least a portion of said recording medium wherein said material is of a character, and is positioned with respect to said plurality of areas in a manner, such that said material provides different reads of said data encoded by said plurality of areas when said material is in its first optical state versus when it is in its second optical state, a first of said optical states occurring prior to an activating radiation and a second optical state after exposure to said activating radiation;

an instruction set incorporated onto said recording medium, said instruction set limiting decoding of at least a portion of said data encoded by said plurality of areas when said material is in its first optical state.

20. The optical recording medium of claim 19, wherein the material is decomposable.

21. The optical recording medium of claim 20, wherein the material is decomposable by exposure to a light source.

22. The optical recording medium of claim 20, wherein the material is decomposed to such an extent that at least a portion of said data recording layer is inaccessible to said optical reader.

23. A method of verifying the authenticity of an optical storage medium having optically-stored data embodied therein and comprising a material capable of a change from a first optical state to a transient second optical state, said method comprising the steps of:

reading optically-stored data with said optical reader at least one locus on the optical medium comprising said material positioned with respect to said optically-stored data to cause different data reads when said material is its first optical state and its second optical state; and determining that the optical medium is authentic if the read of said optically-stored data at such locus is different upon one optical read than a subsequent optical read wherein said transient second optical state eventuates upon interaction of the material with one or more electromagnetic radiation sources, and said second optical state spontaneously converting to said first optical state, said optically-stored data being readable by an optical reader, and change from said first optical state to said second optical state being effectuated by said optical reader.

24. The method of claim 23, further comprising the step of: inputting an identification string that is used to determine the at least one locus.

25. The method of claim 23, wherein the persistence time of said material in its second optical state is less than 99 ms.

26. The method of claim 23, wherein the step of reading at least one locus comprises:

reading a plurality of loci on the medium in a specified order.

27. A data storage medium comprising:

a structure adapted to support data so that the data may be optically read; and a material disposed in or on the structure, wherein said material is adapted to be altered between at least two states, and wherein it is positioned with respect to said structure to affect a read of at least some of said data by an optical reader in a manner that when it is in a first state it inhibits read of said data, but when it is in a second state it allows read of said data, said material requiring an input signal to change from its first state to its second state wherein said input signal is electromagnetic radiation.

28. The storage medium of claim 27, wherein, when said material is a transient state material which does not require an input signal to change from said second state to said first state.

29. The storage medium of claim 28, wherein said material is temporary such that, after a certain amount of time or reads by said optical reader, no data with respect to the at least some of said data is readable by said optical reader.

30. The storage medium of claim 27, wherein said material is a light sensitive material.

31. The storage medium of claim 27 wherein the storage medium is an optical disc.

32. The storage medium of claim 27, wherein said material is a cyanine dye.

33. The storage medium of claim 27, wherein the material has a delay time after which the material changes from the first state to the second state after receiving the input signal.

34. The storage medium of claim 33, wherein said delay time is less than an a time required to read said data supported by said structure using oversampling.

35. The storage medium of claim 27, wherein said material has a persistence during which the material remains in said second state.

36. The storage medium of claim 27, wherein the storage medium includes code that requires detection of said material to at least one of: authenticate the structure, decrypt data supported by the structure, correct data read from the structure, and provide a watermark in data copied from the structure.

37. The storage medium of claim 27, wherein the material is positioned in a plurality of unique discrete areas compared to other storage media in a group.

38. The storage medium of claim 27, wherein the material is disposed at different depths at different locations in the structure.

39. The storage medium of claim 33, wherein said delay time is greater than a time required to read said data supported by said structure using oversampling.

* * * * *